(12) United States Patent
Bradley et al.

(10) Patent No.: US 11,012,438 B2
(45) Date of Patent: May 18, 2021

(54) BIOMETRIC DEVICE PAIRING

(71) Applicant: Apple Inc., Cupertino, CA (US)

(72) Inventors: Bob Bradley, San Jose, CA (US);
Craig A. Marciniak, San Jose, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 15/855,954

(22) Filed: Dec. 27, 2017

(65) Prior Publication Data

US 2018/0205728 A1   Jul. 19, 2018

Related U.S. Application Data

(63) Continuation of application No. 14/871,387, filed on Sep. 30, 2015, now abandoned.

(60) Provisional application No. 62/057,709, filed on Sep. 30, 2014.

(51) Int. Cl.
| | |
|---|---|
| *H04L 29/06* | (2006.01) |
| *H04M 1/66* | (2006.01) |
| *H04W 4/80* | (2018.01) |
| *H04M 1/72412* | (2021.01) |
| *H04W 12/06* | (2021.01) |
| *H04W 12/069* | (2021.01) |
| *G06F 21/32* | (2013.01) |
| *H04M 1/673* | (2006.01) |

(52) U.S. Cl.
CPC .......... *H04L 63/0861* (2013.01); *G06F 21/32* (2013.01); *H04L 63/0492* (2013.01); *H04L 63/06* (2013.01); *H04L 63/083* (2013.01); *H04L 63/0853* (2013.01); *H04M 1/66* (2013.01); *H04M 1/72412* (2021.01); *H04W 4/80* (2018.02); *H04W 12/068* (2021.01); *H04W 12/069* (2021.01); *H04M 1/673* (2013.01)

(58) Field of Classification Search
CPC .......... G06F 21/32; G06F 21/34; G06F 21/35; G06F 21/31; G06F 21/44; H04L 63/0861; H04L 63/08; H04L 63/0853; H04L 63/18; H04L 63/10; H04L 63/061; H04L 9/3231
See application file for complete search history.

(56) References Cited

U.S. PATENT DOCUMENTS

| | | | |
|---|---|---|---|
| 6,167,517 A | 12/2000 | Gilchrist et al. | |
| 6,178,506 B1 * | 1/2001 | Quick, Jr. ......... | H04W 12/0023 713/168 |
| 7,378,939 B2 | 5/2008 | Sengupta et al. | |
| 7,623,659 B2 | 11/2009 | Huang et al. | |
| 7,865,140 B2 | 1/2011 | Levien et al. | |
| 7,925,022 B2 | 4/2011 | Jung et al. | |
| 8,027,518 B2 | 9/2011 | Baker et al. | |
| 8,190,129 B2 | 5/2012 | Ben Ayed | |

(Continued)

FOREIGN PATENT DOCUMENTS

| | | |
|---|---|---|
| CN | 1809792 | 7/2006 |
| CN | 1918584 | 2/2007 |

(Continued)

*Primary Examiner* — Tae K Kim
(74) *Attorney, Agent, or Firm* — Brownstein Hyatt Farber Schreck, LLP

(57) ABSTRACT

A first electronic device is associated with a biometric sensor. Biometric data received by the biometric sensor is used to permit the first electronic device to pair with, unlock, and/or access a second electronic device.

20 Claims, 8 Drawing Sheets

(56) References Cited

U.S. PATENT DOCUMENTS

| | | |
|---|---|---|
| 8,244,211 B2 | 8/2012 | Clark |
| 8,370,640 B2 | 2/2013 | Adams et al. |
| 8,433,919 B2 | 4/2013 | Giobbi et al. |
| 8,438,647 B2 | 5/2013 | Jevans |
| 8,467,770 B1 | 6/2013 | Ben Ayed |
| 8,473,748 B2 | 6/2013 | Sampas |
| 8,694,784 B1* | 4/2014 | Lekies .................. H04L 9/3226 713/169 |
| 8,850,045 B2 | 9/2014 | Berg et al. |
| 8,854,966 B2 | 10/2014 | Fadell |
| 8,994,498 B2 | 3/2015 | Agrafioti et al. |
| 9,032,493 B2 | 5/2015 | Lortz et al. |
| 9,158,906 B2 | 10/2015 | Guajardo Merchan et al. |
| 9,203,819 B2 | 12/2015 | Fenton et al. |
| 9,264,897 B2 | 2/2016 | Ge et al. |
| 9,270,671 B2 | 2/2016 | Bonazzoli et al. |
| 9,298,905 B1 | 3/2016 | Giobbi |
| 9,363,108 B2 | 6/2016 | Bell et al. |
| 9,407,619 B2 | 8/2016 | Tunnell et al. |
| 9,503,894 B2 | 11/2016 | Shanmugam et al. |
| 9,628,273 B2* | 4/2017 | Alshammari ......... H04L 9/0869 |
| 2002/0056043 A1 | 5/2002 | Glass |
| 2002/0090912 A1* | 7/2002 | Cannon ............ H04L 29/12009 455/41.2 |
| 2004/0073795 A1* | 4/2004 | Jablon .................. H04L 9/0844 713/171 |
| 2006/0116107 A1* | 6/2006 | Hulvey ............... H04M 1/6066 455/411 |
| 2007/0050303 A1 | 3/2007 | Schroeder et al. |
| 2007/0106895 A1* | 5/2007 | Huang .................. H04L 9/0866 713/170 |
| 2007/0150415 A1* | 6/2007 | Bundy .................. H04L 9/0866 705/51 |
| 2007/0257104 A1* | 11/2007 | Owen ..................... G06F 21/32 235/380 |
| 2007/0260876 A1* | 11/2007 | Brown ................ H04L 63/0442 713/156 |
| 2008/0137859 A1* | 6/2008 | Jagadeesan ........... H04L 63/062 380/270 |
| 2009/0228707 A1* | 9/2009 | Linsky .................... G06F 21/31 713/171 |
| 2009/0287929 A1* | 11/2009 | Kolesnikov ........... H04L 9/0844 713/171 |
| 2010/0042841 A1* | 2/2010 | King ..................... H04L 9/0844 713/171 |
| 2010/0138666 A1* | 6/2010 | Adams .................... G06F 21/32 713/186 |
| 2011/0047384 A1* | 2/2011 | Jacobs ................. G06K 9/00221 713/176 |
| 2011/0106954 A1 | 5/2011 | Chatterjee et al. |
| 2011/0113485 A1* | 5/2011 | Little ...................... G06F 21/31 726/19 |
| 2011/0191837 A1* | 8/2011 | Guajardo Merchan ...................... G06F 21/32 726/6 |
| 2011/0314153 A1 | 12/2011 | Bathiche et al. |
| 2012/0082312 A1* | 4/2012 | Liu ....................... H04L 9/0844 380/262 |
| 2012/0143707 A1 | 6/2012 | Jain |
| 2012/0159599 A1* | 6/2012 | Szoke ..................... G06F 21/35 726/7 |
| 2013/0036017 A1 | 2/2013 | Galloway |
| 2013/0179944 A1* | 7/2013 | Kozlay ................. H04L 9/3226 726/4 |
| 2013/0237190 A1* | 9/2013 | Smith ................. H04L 63/0492 455/411 |
| 2013/0298208 A1* | 11/2013 | Ayed ....................... H04L 27/00 726/6 |
| 2014/0046664 A1* | 2/2014 | Sarkar ................... H04W 12/06 704/246 |
| 2014/0068725 A1 | 3/2014 | Zhang et al. |
| 2014/0068744 A1* | 3/2014 | Bran .................... H04W 12/003 726/9 |
| 2014/0129843 A1 | 5/2014 | Shi et al. |
| 2014/0136720 A1* | 5/2014 | Bonazzoli ............. H04W 12/06 709/229 |
| 2014/0181925 A1* | 6/2014 | Smith .................... H04L 63/061 726/6 |
| 2014/0237256 A1* | 8/2014 | Ben Ayed ......... H04W 12/0013 713/186 |
| 2014/0325220 A1* | 10/2014 | Tunnell .................... G06F 21/00 713/168 |
| 2015/0028996 A1* | 1/2015 | Agrafioti ................. G06F 21/34 340/5.82 |
| 2015/0077224 A1* | 3/2015 | Pal .......................... G06F 21/35 340/5.61 |
| 2015/0089222 A1* | 3/2015 | White ................. H04L 63/0428 713/168 |
| 2015/0163221 A1* | 6/2015 | Bolin .................. H04L 63/0853 726/7 |
| 2015/0186636 A1* | 7/2015 | Tharappel ............. H04L 63/104 726/8 |
| 2015/0188891 A1* | 7/2015 | Grange ................... H04L 63/06 380/270 |
| 2015/0222517 A1* | 8/2015 | McLaughlin ....... H04L 63/0435 713/156 |
| 2015/0257004 A1* | 9/2015 | Shanmugam ......... H04W 12/06 455/411 |
| 2015/0319149 A1* | 11/2015 | Alshammari ......... H04L 9/0869 713/171 |
| 2016/0094550 A1 | 3/2016 | Bradley et al. |
| 2016/0156636 A1* | 6/2016 | Tan ....................... H04L 9/0838 726/4 |
| 2016/0182507 A1 | 6/2016 | Zhang et al. |

FOREIGN PATENT DOCUMENTS

| | | |
|---|---|---|
| CN | 101124769 | 2/2008 |
| CN | 101208701 | 6/2008 |
| CN | 101467204 | 6/2009 |
| CN | 101933051 | 12/2010 |
| CN | 101946472 | 1/2011 |
| CN | 102255896 | 11/2011 |
| CN | 102263643 | 11/2011 |
| CN | 102292731 | 11/2011 |
| CN | 103310142 | 9/2013 |
| CN | 103890768 | 6/2014 |
| CN | 103907328 | 7/2014 |
| TW | M415369 | 11/2011 |
| WO | WO 98/012670 | 3/1998 |
| WO | WO 06/128171 | 11/2006 |

* cited by examiner

BIOMETRIC DEVICE PAIRING

CROSS-REFERENCE TO RELATED APPLICATION

This application is a continuation of U.S. patent application Ser. No. 14/871,387, filed Sep. 30, 2015, entitled "Biometric Device Pairing," which claims the benefit under 35 U.S.C. § 119(e) of U.S. Provisional Patent Application No. 62/057,709, filed Sep. 30, 2014, entitled "Biometric Device Pairing," both of which are incorporated herein by reference in their entirety as if fully disclosed herein.

FIELD

Embodiments disclosed herein relate to biometric data which may be used to authenticate and identify users of various electronic devices and, more particularly, to various biometric data which may be communicated from a first secure electronic device to a second secure electronic device in to allow an identified user to access the second secure electronic device.

BACKGROUND

Biometric identification or authentication may be used in computers and other electronic devices as a form of identification and access control. Biometric identifiers are distinctive, measurable physiological characteristics related to the configuration or characteristics of the body that can be used to identify individuals. Example biometric identifiers include, but are not limited to, a fingerprint, face recognition, DNA, a palm print, hand geometry, iris recognition, retina recognition, and scent. A biometric system may perform an identification comparison against a biometric database in an attempt to establish the identity of an individual. The system will identify the individual by comparing a biometric sample such as a fingerprint to stored fingerprint samples in the database. Biometrics may be used in place of, or in conjunction with, other methods of personal recognition such as passwords, PINs or keys.

Fingerprint recognition features may be available on some portable electronic devices, such as smartphones, thereby allowing users to unlock their phone, as well as to make purchases by using fingerprints stored on their device. The use of biometrics may supplement or displace the use of a password to access a portable electronic device. A biometric sensor may, for example, be built into the home or start button of a smartphone (or any other input device or region) to sense or detect a user's fingerprint and grant or deny access based on that fingerprint.

SUMMARY

Disclosed embodiments use biometric device pairing to allow biometric identification-equipped devices to be used for pairing with other electronic devices and/or for secure access to the other electronic devices, including non-biometric authentication enabled devices. The biometric identification-equipped device (or simply, "biometric equipped device," "biometric enabled device" or "biometric device") may establish a secure connection with a second, different device. The connection is based at least in part on the acquisition and verification of biometric data. Thereafter, the biometric device may access the second device to retrieve data, configure the second device, transmit data, or otherwise interact.

In certain embodiments, a one-time initialization process exchanges credentials between the biometric equipped devices and the non-equipped devices. Once the credentials are exchanged between the devices, the biometric enabled device establishes a secure channel from the credentialed device. The biometric enabled device receives a user's biometric data, verifies the biometric data, and sends a message or signal to the non-enabled device to unlock that device. A password or other authorization is thus not needed to access the non-enabled device and the user may thus access that device securely and conveniently after authentication by the biometric enabled device. The non-enabled device may or may not include biometrics in some embodiments. That is, both the first and subsequent device(s) may be biometrically enabled in some embodiments.

In one embodiment, the biometric enabled device is a smartphone with a fingerprint sensor to permit a user to unlock the smartphone and, in turn, unlock one or more other devices such as a laptop computer which may or may not be biometric enabled. Because accessing one electronic device of a user allows access to one or more other electronic devices of the user without password or other entry protocol, this system is more convenient, is easier for a user, and contributes to the overall user satisfaction. The biometric pairing system thus allows accessibility to multiple devices with one security verification between the various devices.

In one aspect, an electronic device includes a first biometric sensor and a processing device operably connected to the first biometric sensor. The processing device may be configured to receive biometric data from the first biometric sensor and determine if the biometric data matches a biometric template. At least one transmitter device is operably connected to the processing device. The at least one transmitter device is operative to pair the electronic device to a second electronic device across a network and to transmit an authorization message to the second electronic device based on a match between the biometric data and the biometric template. The authorization message permits the electronic device to automatically access the second electronic device.

In another aspect, a method for a controller device to pair with an accessory device includes receiving, by the controller device, biometric data associated with a user of the controller device and establishing a secure connection between the controller device and the accessory device. The controller device can generate an asymmetric key pair based on the biometric data to produce a first public key. The controller device and the accessory device may then exchange public keys. The controller device transmits the first public key to the accessory device, and receives a second public key associated with the accessory device.

In yet another aspect, a method for a controller device to access information on an accessory device paired with the controller device can include a controller device receiving first biometric data and generating an authorization message based on a match between the first biometric data and a first biometric template. The authorization message is then communicated from the controller device to the accessory electronic device. The accessory device may be unlocked based on the authorization message. Based on the authorization message, the controller device can access the information on the accessory device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
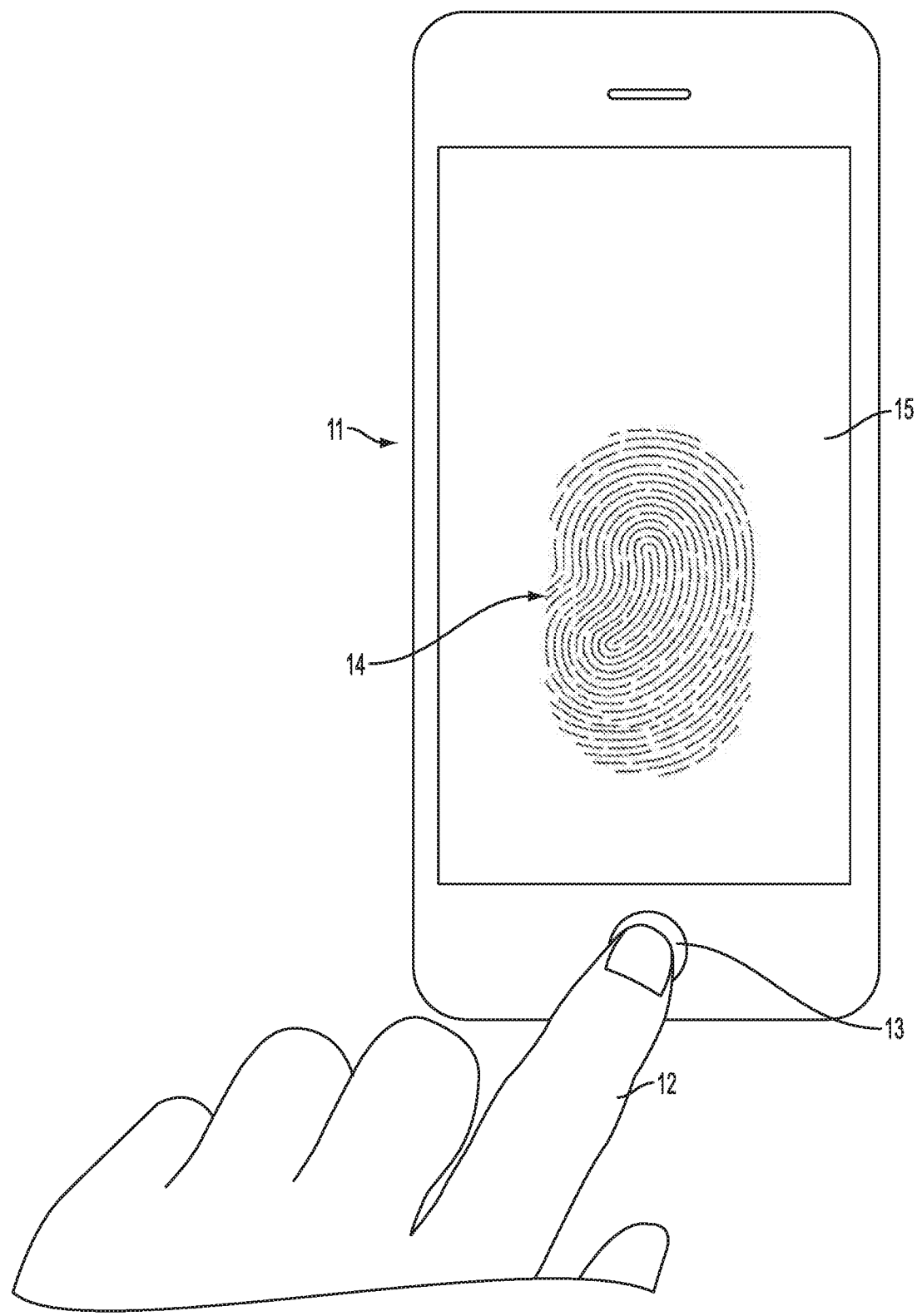
FIG. 1 is a front view of an electronic device.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Reference will now be made in detail to representative embodiments illustrated in the accompanying drawings and in particular with reference to FIGS. 1-11. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. Those skilled in the art will readily appreciate that the detailed description given herein with respect to these figures is for explanatory purposes only and should not be construed as limiting. Like reference numerals denote like structure throughout each of the various figures.

Pairing is a process used in computer networking to set up an initial link between computing devices in order to allow communications between them. In some embodiments, user authentication (e.g., authentication of user based on biometric data) on one device may be communicated wirelessly to another device to allow that user to access the second device without entering a password or other authentication indicia.

Generally, embodiments described herein may pair two or more devices such that a person possessing one of the devices (a "controller device") may access data, applications, and the like from the other devices after authorization (e.g., authentication of user based on biometric data) of the controller device is complete. The authorization may be performed wirelessly in many cases, and may last for a set period of time or until some condition is reached. As one non-limiting example, authorization may last until a network or other wireless connection between the paired devices is lost. This may permit a person having the controller device on his or her person, or nearby, to physically access other devices without forcing that person to enter security credentials. As another option, this may allow a person to access data from paired devices remotely through the controller device.

Generally, the authorization may occur across a secure, encrypted communication channel. As part of the authorization, the controller device may transmit an acknowledgement or indication that a user or other person associated with the controller device has provided biometric data to the controller device, and that the controller device has recognized the person based on the biometric data. Thus, the controller device may serve as a gateway for a user to access the other devices; in such embodiments it is not necessary that all devices have the capability or physical structure to access, receive or interpret biometric data. Nonetheless, the security associated with biometric data acquisition and recognition may be extended to all paired devices insofar as they may rely on the controller device to gather biometric data and recognize an authorized, enrolled person from such data.

In some embodiments, a low power transmitter device communicates with the controller device and the paired device(s). The low power transmitter device can utilize a wireless personal area network radio wavelength communication technology designed to be used over short distances from fixed and mobile devices. The low power transmitter device can be used to identify device locations in indoor venues where global positioning system (GPS) technologies are not as effective due to interference with overhead satellite communications by the structures defining the indoor venues. The low power transmitter device may also be used to provide communications between the electronic devices over these same, relatively short, distances.

In the disclosed embodiments, the biometric data is described as fingerprint data or a fingerprint(s). However, in some embodiments the biometric data can be other types of biometric data and/or data that is derived from (or based on) the biometric data. Example biometric data includes, but is not limited to, a user's voice, a palm print, veins, face, iris, and/or retina. Additionally or alternatively, the data that is derived from, or based on, a user's biometric data can include a histogram, a numerical score, a code, a key, a message, and so on.

Referring to FIG. 1, a portable electronic device 11 is shown, in the form of a smartphone. A user's finger 12 is placed on an input element 13 to unlock and provide convenient and secure access to the electronic device 11. The input element 13 includes a biometric sensor positioned below, or as a part of, the input element 13. In some embodiments, the input element 13 is a button, while in others it may be a portion of a display 15, a switch, a region below an ink mask or otherwise inoperative to display data, a portion of a housing, and so on. A fingerprint 14 is sensed by the biometric sensor and may be shown on the display 15 of the electronic device 11, or an image corresponding to the fingerprint (or portions of the fingerprint) may be displayed. For example, a synthetic fingerprint may be displayed in lieu of the actual fingerprint. The fingerprint 14 may be used to access or unlock the electronic device 11 and to permit a user to make purchases or effectuate other secure transactions on the electronic device 11. The electronic device 11 may also allow a user to enroll multiple fingerprints from other individuals known to, and trusted by, the user.

Because this biometric access feature provides convenient and secure access to a device, a portable electronic device may also include capability to allow a user to utilize the same access to certain other of the user's electronic devices such a laptop computer, a tablet computer, a wearable computing device (e.g., smart watch or health assistant), or another portable electronic device which may or may not be biometric access enabled.

Figure 2:
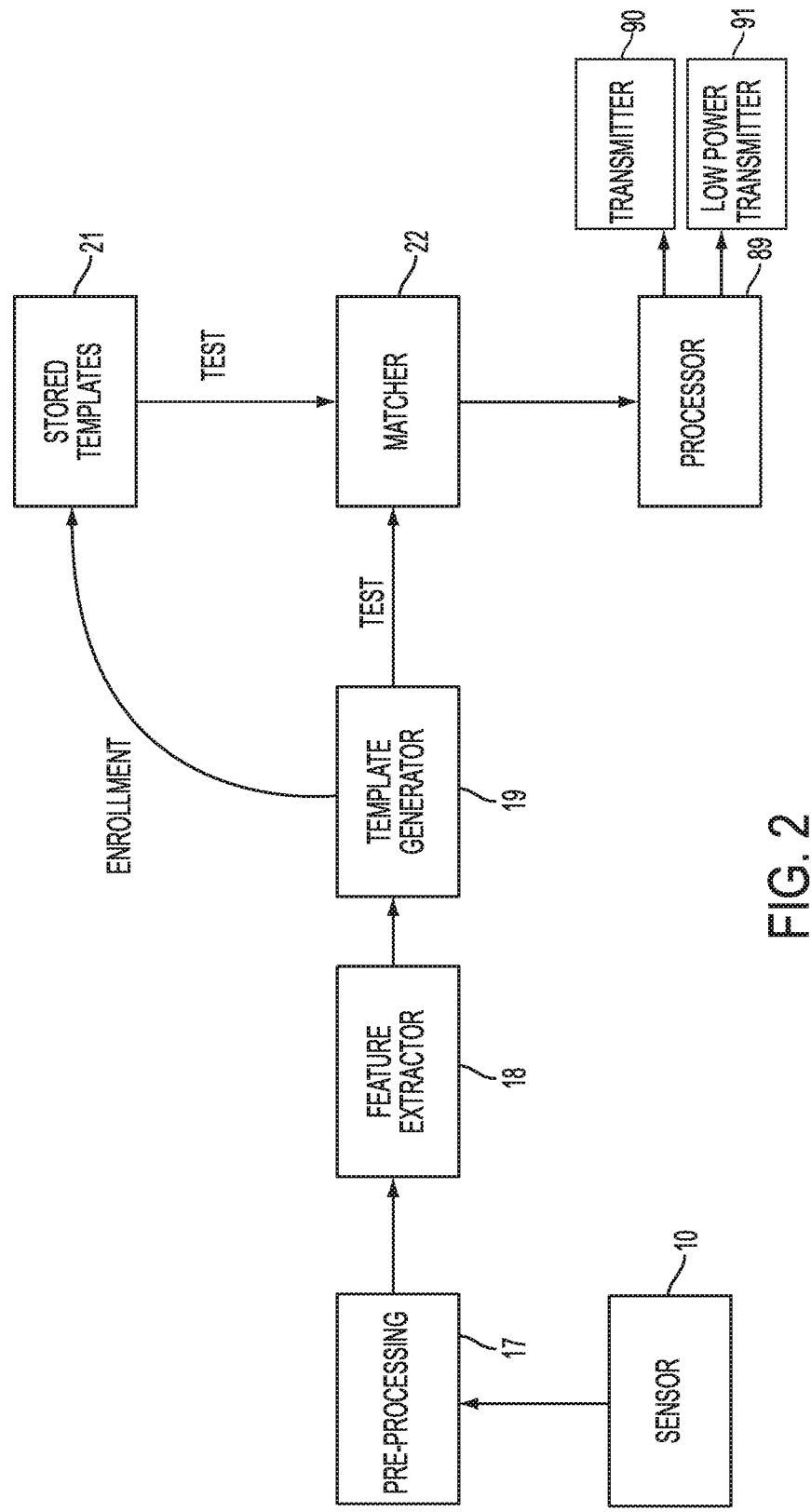
FIG. 2 is a schematic illustrating an example biometric sensing system.

Referring to FIG. 2, one example of a biometric sensing system is shown as a block diagram, although it should be appreciated that this is only one example and many other systems and implementations may exist. In one embodiment, all of the illustrated components are included in the electronic device 11. In another embodiment, some of the illustrated components are included in the electronic device 11. For example, the low power transmitter device 91 may be a low power transceiver that is separate from the electronic device 11 and communicably coupled to the electronic device 11.

A biometric sensor 10 is the interface between the biometric sensing system and a user's biometric data. As described earlier, the biometric sensor 10 can be placed on, in, or below the input element 13 of the electronic device 11. In some embodiments, the biometric sensor 10 may be located in portions of the electronic device 11 other than adjacent to input element 13.

The biometric sensor 10 acquires biometric data such as, for example, a fingerprint 14 of a user. While the illustrated biometric sensor 10 is generally an image acquisition system, in other embodiments the biometric sensor can be a voiceprint recognition device, a finger length sensor, a retinal scanner, or other biometric sensor according to the desired user characteristics to be sensed. For example, in some embodiments, the biometric sensor 10 can be a microphone on the electronic device 11 which may identify a voiceprint of a user to be used for biometric access.

Pre-processing of the sensed biometric data may be accomplished by a pre-processing component 17, which may be operative to do one or more of: remove artifacts from the sensed image; enhance the image (for example by removing background noise); and normalize the image data. Data is then transmitted to feature extractor 18, which may identify certain features of the captured image, such as the whorls and lines in a fingerprint.

In some embodiments, a vector of numbers or an image with particular properties representing identifying features is used to create a template in a template generator 19. A template is a synthesis of the relevant identifying characteristics and is extracted from source images or other biometric data. Elements of the biometric measurement that are not used in the comparison algorithm typically are discarded in the template to reduce the data requirements. In the enrollment process, for a first time user, the template generated in the template generator 19 may be stored in a storage device 21 for future use to allow that user to become a permitted user and access the electronic device 11.

In the verification or test process, the biometric data (e.g., fingerprint) sensed by the biometric sensor 10 is compared against stored templates in the storage device 21 and a matching identity determined by comparative matching device 22 is sent to the electronic device 11 to verify the identity of the user. In some embodiments, multiple biometric templates may be enrolled and stored in the storage device 21. The storage device 21 can be configured as one or more memories, including, but not limited to, RAM, ROM, flash memory, and removable memory, or combinations thereof. The multiple biometric templates may be from the primary user or they may be from one or more individuals approved by the primary user to allow more than one user to be verified as an approved user and granted access to the electronic device 11. The user thus controls who may access the electronic device 11.

Although particular operations have been discussed and described for enrollment, template generation, testing and authorization, it should be appreciated that many other methods and systems for each such operation exist. Accordingly, the foregoing is intended to provide only one example of various biometric enrollment/sensing operations and is not intended to limit embodiments described herein.

The electronic device 11 may include a number of other electronic components, such as a processor 89 operative to generally control certain operations of the electronic device. Although not shown in FIG. 2, the processor 89 can be operably connected to one or more of the components in the electronic device, such as the biometric sensor 10, the pre-processing component 17, the feature extractor 18, the template generator 19, the storage device 21, the comparative matching device 22, a first transmitter device 90, and a second transmitter device 91. In some embodiments, the operations of the pre-processing component 17, the feature extractor 18, the template generator 19, and/or the comparative matching device 22 can be performed by the processor 89. The processor 89 can be implemented with one or more suitable data processing devices, examples of which include a microprocessor, an application-specific integrated circuit (ASIC), and a central processing unit (CPU).

The first transmitter device 90 is operative to communicate wired or wirelessly with other devices. The first transmitter device 90 can send and receive data and communications to and from the other devices. Example transmitters include, but are not limited to, Wi-Fi, Bluetooth®, and near field communication. The second transmitter device 90 may be a low power transmitter device that is operative to transmit and receive data and communications (wired or wirelessly) associated with the biometric sensor 10 to other devices, thereby permitting the electronic device to access other electronic devices. Data transmission, wireless and/or wired communication, and other functions of the electronic device will be described in more detail later.

A user may choose to store multiple biometric templates in the biometric sensing system of FIG. 2. In one embodiment, a user may choose a fingerprint from an index finger as one template while a ring finger fingerprint or a thumbprint may be used as another template. A user may thus add a level of security for various applications. For example, certain information on the electronic device 11, or on another paired/authorized electronic device, may be accessible only by using a first authorized fingerprint while other information may be accessed using a second, different authorized fingerprint. A retinal scanner, a voiceprint, or other scanner may also be used as the biometric sensor. In some embodiments, various combinations of these types of sensors and/or indicia could be used to provide various levels of security.

Figure 3:
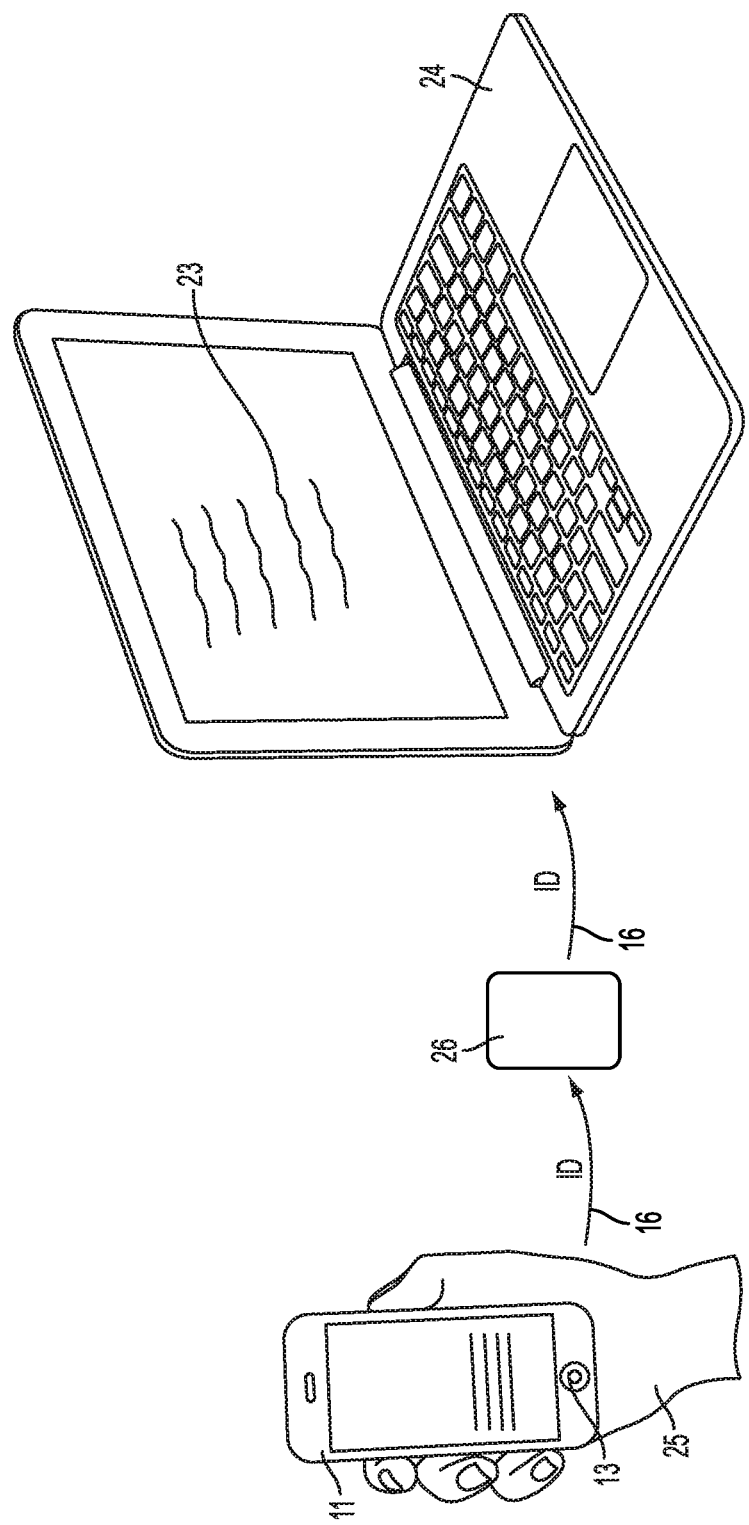
FIG. 3 shows a biometric enabled electronic device accessing a second electronic device.

Referring to FIG. 3, certain embodiments permit a user to access a second electronic device 24 from the first electronic device 11 equipped with a biometric identification system, one non-limiting example of which was described above with respect to FIGS. 1 and 2. Some electronic devices may not have biometric sensors and may require passwords or other security measures to access them. The first electronic device 11 may bypass such security measures by pairing with the second electronic device 24.

Alternatively, in some embodiments it may be convenient to access multiple devices from one biometric-enabled device, even if the other devices also have biometric access capability. For example, in a situation where a user has a device, such as electronic device 11, and wishes to access another device, such as electronic device 24, it may enhance or facilitate the user's operation to access the second electronic device 24 and/or information 23 contained in the second electronic device 24 (e.g., a document) without entering any additional security verification into the second electronic device 24. The user may physically access, without additional security verification, the second electronic device 24 so long as the biometric-enabled first electronic device 11 is on the user's person or near the second electronic device 24, for example.

Referring to FIG. 3, a user 25 holding the first electronic device 11 (e.g., a smartphone) may securely access the second electronic device 24 (e.g., a laptop computer) using biometric authentication. In this embodiment, the user 25 places his or her finger on or near the input element 13, which captures an image of the user's fingerprint. That image is validated (for example, as described above) and the user 25 is granted access to the first electronic device 11.

An identification or other authorization message 16 may be transmitted (wired or wirelessly) across a network to the second electronic device 24 (or any other suitable electronic device). In some embodiments, a wireless transceiver device 26 may communicatively couple the first electronic device 11 (e.g., smartphone) to the second electronic device 24 (e.g., laptop computer). Any suitable wireless transceiver device may be used. Example wireless transceiver devices include, but are not limited to, beacons, repeaters, range extenders, and relay transmitters. The wireless transceiver device can employ any suitable communication protocol, such as Bluetooth® Low Energy. In some embodiments, the wireless transceiver 26 may be the low power transmitter device 91 in FIG. 3. In other embodiments, the first and second electronic devices 11, 24 may communicate directly with one another.

Communicating the authorization message 16 from the first electronic device 11 to the second electronic device 24 generally permits the first electronic device 11 and/or its user to access the second electronic device 24 and some or all of the information 23 contained therein. It should be appreciated that certain embodiments may permit access to the second electronic device 24 only through or by the first electronic device 11. In other embodiments, the exchange of authorization messages or signals (as described in more detail below) may effectively unlock the second electronic device 24, thereby permitting access through conventional means such as the second electronic device's keyboard, mouse, or other input. The second electronic device 24 may remain unlocked or otherwise accessible as long as it is in communication with the first electronic device 11, or the second electronic device 24 may remain accessible only for a period of time after which another authorization operation may be necessary. The second electronic device 24 may further periodically look for the presence of the first electronic device 11. In some embodiments, if the first electronic device 11 is found, the time before which another authorization is requested may be extended.

For example, in some embodiments the first electronic device 11 and the second electronic device 24 can transmit data between functions, applications, operating software, and other software on one or both electronic devices after the second electronic device is unlocked based on the fingerprint. Additionally or alternatively, one electronic device (e.g., the first electronic device 11) can initiate an online purchase that is completed on the other device (e.g., the second electronic device 24). For example, an online purchase of an audio or video file can be initiated on the first electronic device 11. The payment information (e.g., credit card information) may be transmitted to the online store from the second electronic device 24 and/or the audio or video file can be downloaded to the second electronic device 24.

Similarly, one electronic device (e.g., the first electronic device 11) can initiate an operation that is completed or performed by the other device (e.g., the second electronic device 24) based on biometric data. For example, the second electronic device 24 can be used to initiate the capture of an image and the first electronic device 11 can then capture the image. Thereafter, in some embodiments the first electronic device 11 may transmit the captured image to the second electronic device 24. In another example, the first electronic device 11 can be used to initiate the sending of an email and the second electronic device 24 may then send the email.

In some embodiments, the first electronic device can utilize biometric data to pair with the second electronic device. Additionally or alternatively, the first electronic device 11 can set up or change the settings of the second electronic device. For example, based on biometric data, the first electronic device 11 can be used to change a network setting or a password on the second electronic device.

Referring again to FIG. 3, the user 25 may wish to retrieve the information 23 from the second electronic device 24. In some situations, the information 23 may contain particularly sensitive personal information of the user 25. The user 25 may thus include an additional level of security on the second electronic device 24 by designating a requirement that a certain fingerprint, for example his or her thumbprint, be required for access to the information 23 while his or her index fingerprint may be used to simply unlock the second electronic device 24. In this way, an additional layer of security may be added for sensitive information. A user could thus grant access to the second electronic device 24 to certain individuals without granting those individuals access to personal information such as information 23.

In other embodiments, various activities may be enabled by one or more stored biometric data. For example, a user may unlock the second electronic device 24 with a fingerprint while a retinal scan or other biometric data can be used to enable additional operations such as authorizing an online purchase. In other embodiments, various other actions, such as downloading information or documents online, may be enabled by a specific type of biometric data. As another example, stored biometric data could be used to enable access to remote storage of data, such as data stored in a cloud computing network.

As yet another example, accessing a user's bank account or banking online may require one or more particular types of biometric data to authorize that user and enable access. Continuing the example, sensing a user's fingerprint or other biometric data may be required to access that user's account and withdraw money from an automated teller machine. In other embodiments, enabling online purchases or use of a credit card could be authorized by sensing particular biometric data of the person on his or her portable electronic device and conveying that information to a paired device such as a vendor computer to authorize the transaction.

In order to accomplish the access and authentication activities described above with respect to FIG. 3, suitable electronic devices may first establish communication links to each other. This process is known as "pairing". Pairing generally is a one-time operation that establishes a communication/data link between two devices; the data link may be wireless in many embodiments and may be cryptographically secured. Once devices are paired in this manner, they can be cryptographically verified on each subsequent use.

Figure 4:
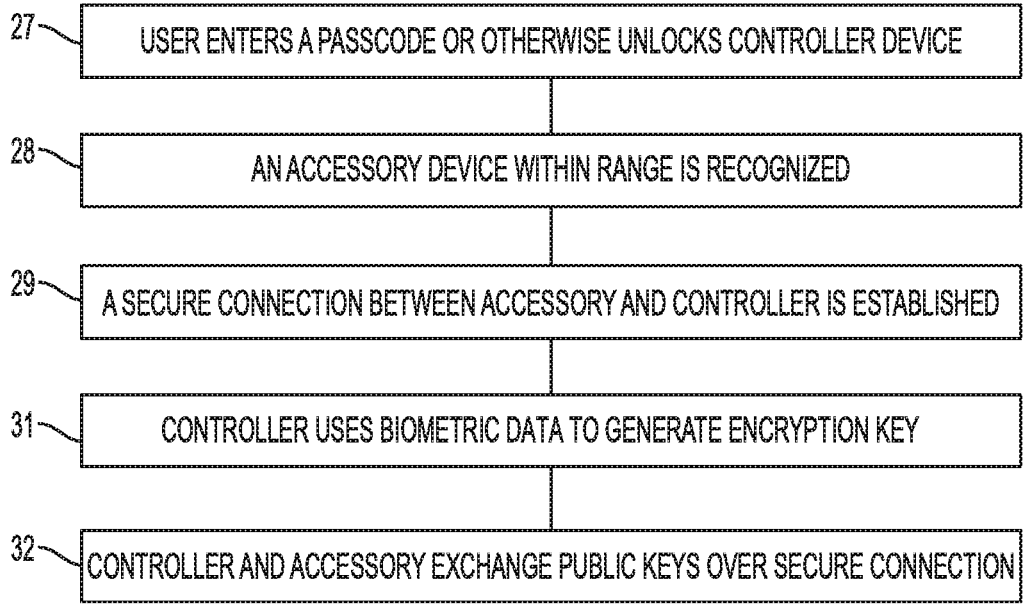
FIG. 4 is a flowchart showing example operations for pairing two electronic devices.

FIG. 4 is a flowchart showing example operations for pairing two electronic devices. In this embodiment, the electronic device with a biometric sensor that is used to authorize operations on another electronic device is referred to as a "controller device". The electronic device whose operations are being authorized by the controller device (the electronic device that is accessed by the controller device) is referred to as the "accessory device". In the example embodiment shown in FIG. 3, the controller device is the first electronic device 11 (e.g., a smartphone) and the accessory device is the second electronic device 24 (e.g., a laptop computer). While these "paired" electronic devices may be in close physical proximity in some embodiments, the electronic devices may also be remote such as a vendor computer or server in other embodiments.

Referring to FIG. 4, in operation 27, a user (e.g., user 25) enters a passcode or otherwise unlocks a controller device. The passcode or unlocking mechanism may be a biometric authorization such as a fingerprint or other biometric data as described earlier. In operation 28, the accessory device is recognized as being in a communication range through the wireless transceiver 26. In other embodiments, the controller device can recognize that the accessory device is within a communication range by itself (without the use of the wireless transceiver 26).

In operation 29, a secure connection between the controller device and the accessory device is established. Once this secure connection has been established, the controller device uses the biometric information (e.g., sensed biometric data such as a fingerprint) to generate an encryption key in operation 31. In operation 32, the controller device and the accessory device exchange public keys over the secured connection established in operation 29. The controller device and the accessory device are now paired and the process of authorizing the user to securely access the accessory device will be described below with respect to FIG. 5.

Figure 5:
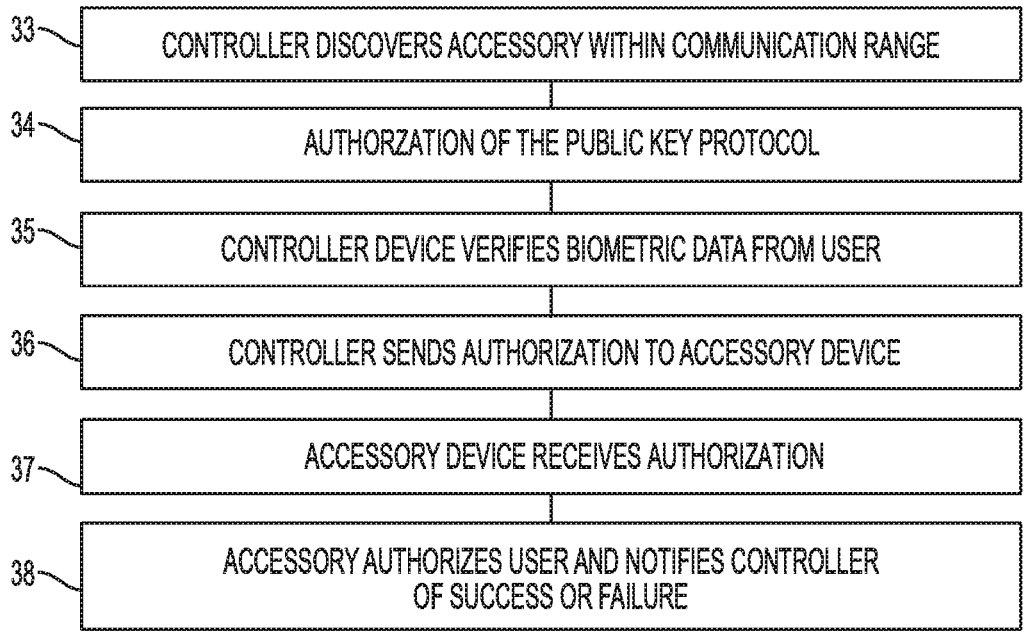
FIG. 5 is a flowchart showing example operations for authorizing a user after the electronic devices have been paired.

Once the controller device (e.g., first electronic device 11) and the accessory device (e.g., second electronic device 24) have been paired as described above with respect to FIG. 4, the process of authorization may begin. Referring to FIG. 5, to initiate the authorization process, the controller device must first discover the accessory device is within communication range (operation 33). As will be further described below, the accessory device transmits a request if an operation, such as access to the accessory device, includes authorization. In some embodiments, the request can be transmitted through a wireless transmitter (e.g., wireless transceiver 26) to the electronic devices within the communication range. In one embodiment, the communication range may be about two (2) meters. Once the accessory device has been "discovered" in operation 33, the verification of the public key protocol between the controller and accessory devices occurs in operation 34. The controller device then verifies the biometric information from the user of the controller device (operation 35). In one embodiment, the biometric information includes a fingerprint obtained through a biometric sensor. If the biometric information is verified, the controller device sends an authorization message (e.g., authorization 16 in FIG. 3) to the accessory device in operation 36, which is received by the accessory device in operation 37. The accessory device then authorizes the user to access the accessory device and notifies the controller device of the authorized access.

Figure 6:
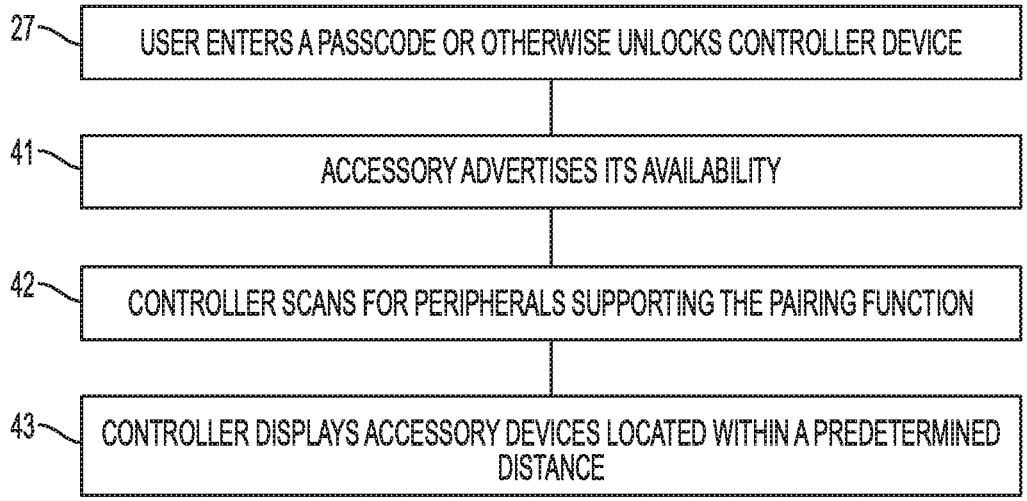
FIG. 6 is a flowchart illustrating initial example operations for pairing two electronic devices.

Referring to FIG. 6, the pairing process of FIG. 4 is described in more detail. Specifically, operation 28 of the pairing process shown in FIG. 4 is further described in FIG. 6. In operation 27, the user enters a passcode or otherwise unlocks the controller device. As described in conjunction with FIG. 4, the passcode or unlocking mechanism may be a biometric authorization such as a fingerprint or other biometric data.

In operation 41, the accessory device advertises its availability while the controller device scans for peripherals supporting the pairing function in operation 42. In some embodiments, the controller device discovers the accessory device through a wireless communications device (e.g., wireless transceiver device 26) using Bluetooth® Low Energy or another protocol. In operation 43, the controller device displays the electronic devices (including the accessory device) located within a predetermined distance. In one embodiment, the predetermined distance is a communication range, which can be approximately 2 meters.

Figure 7:
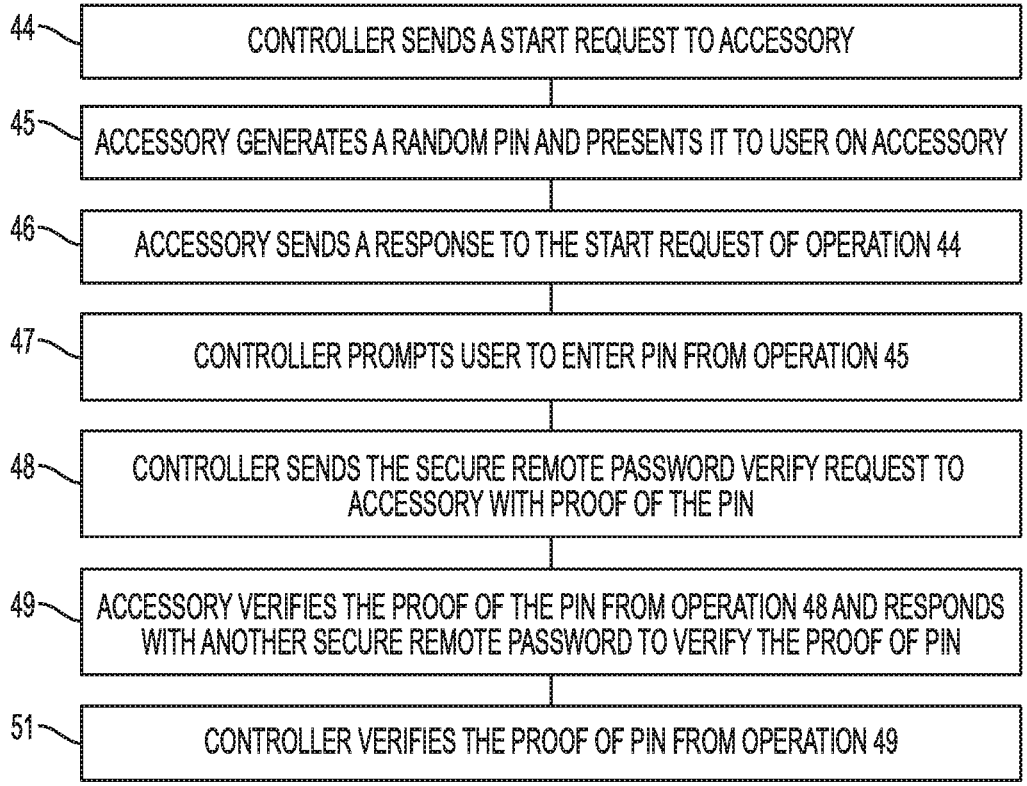
FIG. 7 is a flowchart including additional example operations for establishing a secure channel between controller and accessory devices.

Referring to FIG. 7, after the accessory device is "discovered" through the operations described in FIG. 6, a secure connection is established between the controller device and the accessory device (operation 29 of FIG. 4). In one embodiment, the secure connection can be created as follows. In operation 44, the controller device sends a start request to the accessory device. The start request can include a secure remote password and a personal identification number (PIN). In operation 45, the accessory device generates a random PIN and presents it to the user on the accessory device. In operation 46, the accessory device sends a response to the start request of operation 44. In operation 47, the controller device then prompts the user to enter the PIN from operation 45. In operation 48, the controller device sends a secure remote password verify request to the accessory device with proof of the PIN. In operation 49, the accessory device verifies the proof of the PIN from operation 48 and responds with another secure remote password to verify the proof of PIN. In operation 51, the controller device verifies the proof of PIN from operation 49. Thereafter, the secure connection between the accessory device and the controller device is established.

Figure 8:
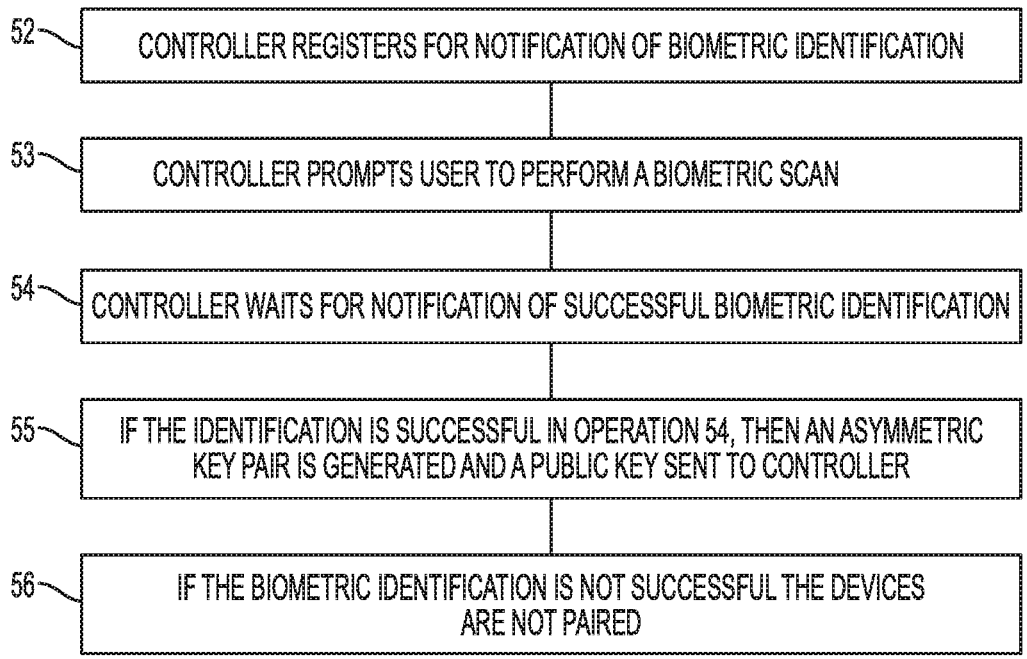
FIG. 8 is a flowchart further illustrating an example pairing process.

Referring to FIG. 8, operation 31 of the pairing process shown in FIG. 4 is described in greater detail. In operation 52, the controller device registers for notification of biometric identification. In operation 53, the controller device prompts the user to perform a biometric scan which, in the embodiments described in FIGS. 1-3, is to touch the user's finger to the input element 13 (positioned above biometric sensor 10). In operation 54, the controller device waits for notification of a successful biometric identification. In one embodiment, the controller device waits for notification from the comparative matching device 22 in FIG. 2. The notification may be sent by the transmitter device 90 and/or the low power transmitter device 91.

If the identification is successful in operation 54, then a processor (e.g., processor 89) generates an asymmetric key pair and returns a public key to the controller device (operation 55). In one embodiment, the processor is a secure enclave processor, which is tamper-resistant processor capable of securely hosting code and data. If the biometric identification of operation 55 is not successful, the pairing of the accessory and controller devices does not occur and the process is terminated (operation 56).

Figure 9:
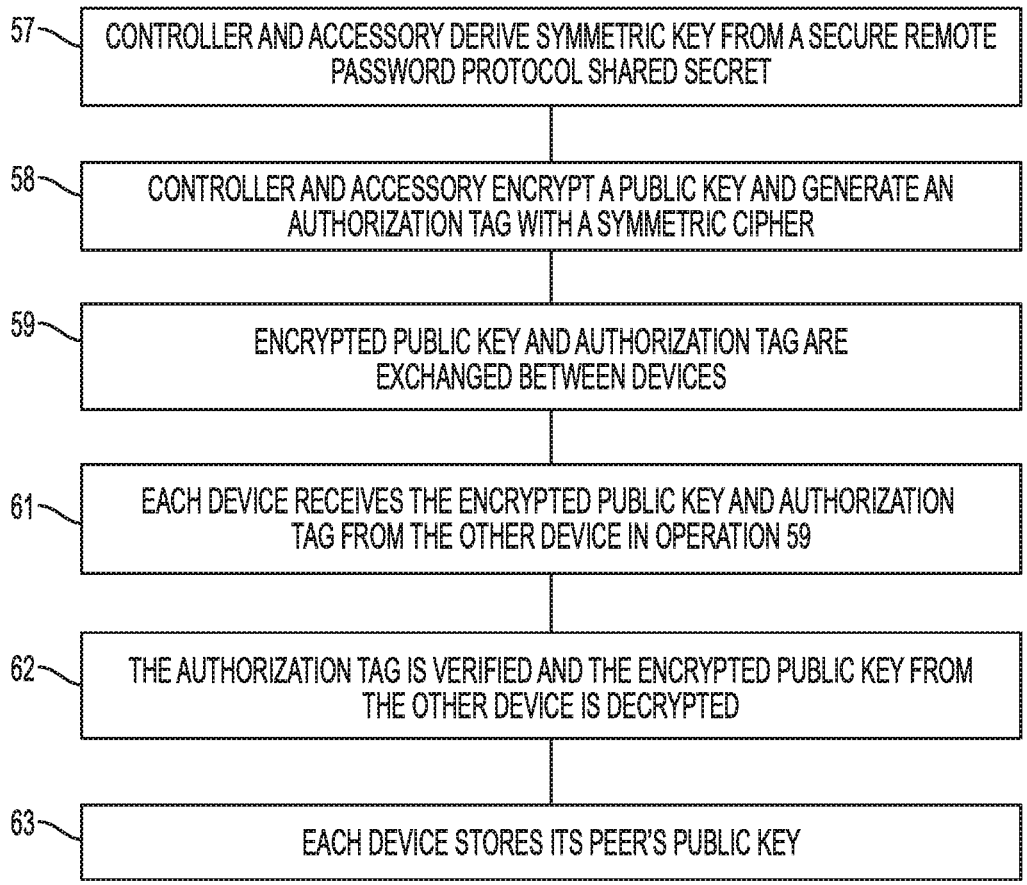
FIG. 9 is a flowchart illustrating example operations in the pairing process.

The final operation in the example pairing process of FIG. 4 is to have the accessory device and the controller device exchange public keys over a secure channel to establish the pairing of the devices (operation 32 in FIG. 4). Referring to FIG. 9, operation 32 is accomplished in some embodiments by first having each electronic device (e.g., the controller and accessory devices) derive a symmetric key from a secure remote password protocol shared secret key (operation 57). In operation 58, each electronic device encrypts a public key and generates an authorization tag with a symmetric cipher. In operation 59, the encrypted public key and the authorization tag are exchanged between the controller device and the accessory device (the devices which are to be paired). In operation 61, the accessory device and the controller device each receives the encrypted public key and authorization tag from the other electronic device. In operation 62, the authorization tag is verified and the encrypted public key from the other electronic device is decrypted. In operation 63, each electronic device stores the other device's public key in order to complete the pairing of the controller and accessory devices. After completion of these operations, the controller and accessory devices are paired.

Figure 10:
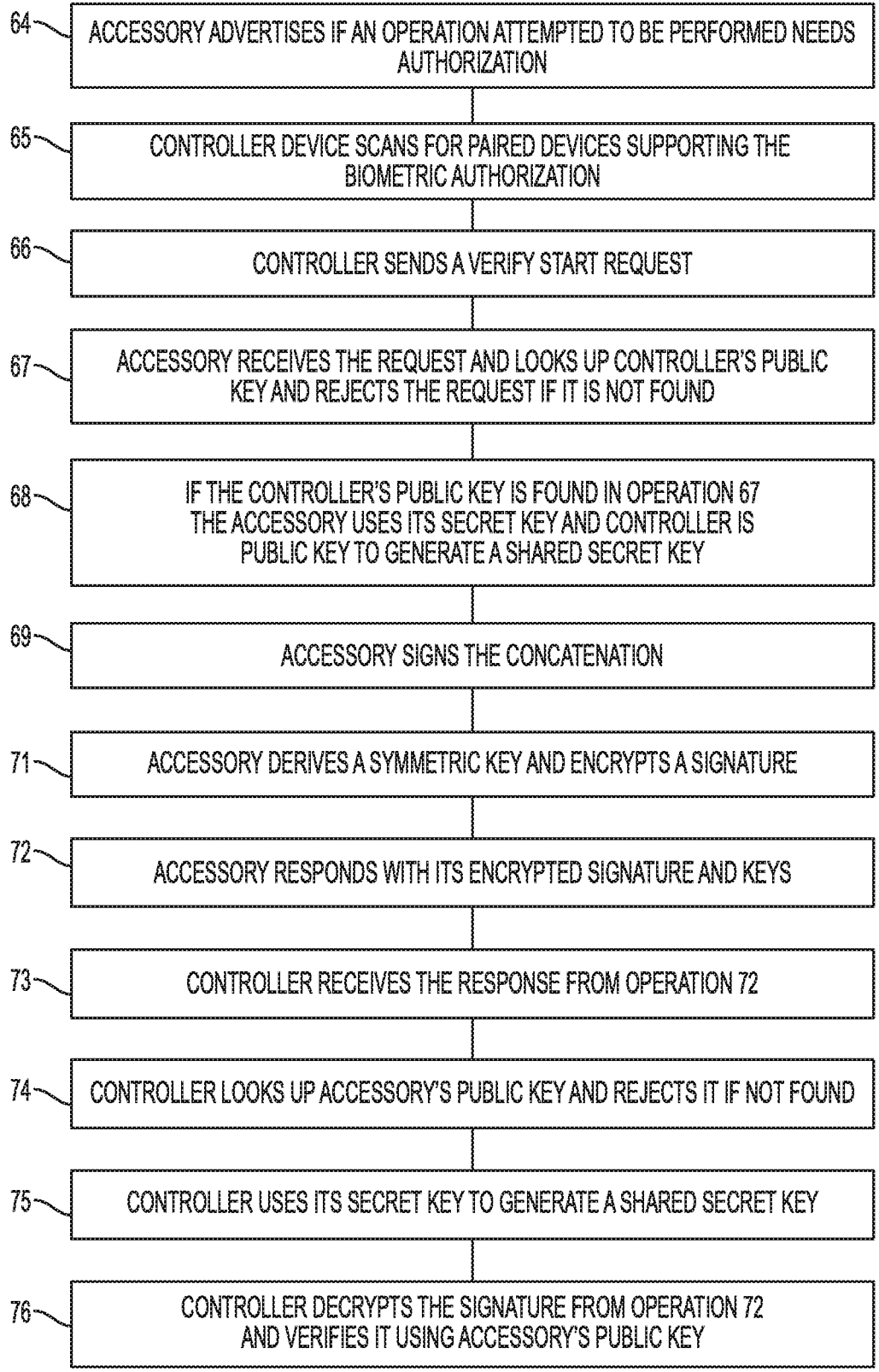
FIG. 10 is a flowchart of example initial operations in the process of authorizing an operation on an accessory device.

Once the controller and accessory devices have been paired, the controller device may be used to authorize operations on the accessory device. Referring to FIG. 10, operations 33 and 34 of FIG. 5 are described in greater detail. The process to authorize an operation on the accessory device begins with the controller device discovering the accessory device using Bluetooth® or other wireless network. In some embodiments, a Bluetooth® Low Energy (BTLE) wireless network may be used. In operation 64, the accessory device advertises if an operation to be performed on it (such as user log in) needs authorization. At operation 65, the controller device scans for paired devices supporting the biometric authorization. In order for the successful communication and completion of the authorization function, the accessory device must be within a communication range of the controller device, which can be approximately 2 meters in one embodiment. If the controller and accessory devices are not within the communication range, the controller device ignores the accessory device because the accessory device is beyond the predetermined distance or communication range.

Referring again to FIG. 10, the verification operation 34 is described in more detail. The station to station pair verification process proceeds in operation 66 with the controller device sending a verify start request including a public key. In one embodiment, the a verify start request including a public key may be an Elliptic Curve Diffie-Hellman (ECDH) key agreement protocol public key and long-term public key (LTPK). The accessory device receives the request at operation 67 and searches for the public key of the controller device. The accessory device rejects the request if the public key of the controller device is not found.

If the public key of the controller device is found, the accessory device uses its secret key and the controller device's public key to generate a shared secret key in operation 68. At operation 69, the accessory device uses its long term secret key to sign the concatenation of its public key and the public key of the controller device.

The authorization process continues at operation 71 with the accessory device deriving a symmetric key from the shared secret key and encrypting a signature of the shared public keys. The accessory device then responds with its keys and encrypted signature at operation 72.

At operation 73, the controller device receives the response from operation 72, and at operation 74 searches for the public key of the accessory device and rejects it if not found after searching. In operation 75, the controller device uses its secret key and an ECDH public key to generate a shared secret key which may, in one embodiment, be an ECDH key. The controller device decrypts the signature from operation 72 and verifies the signature using the public key of the accessory device (operation 76).

Figure 11:
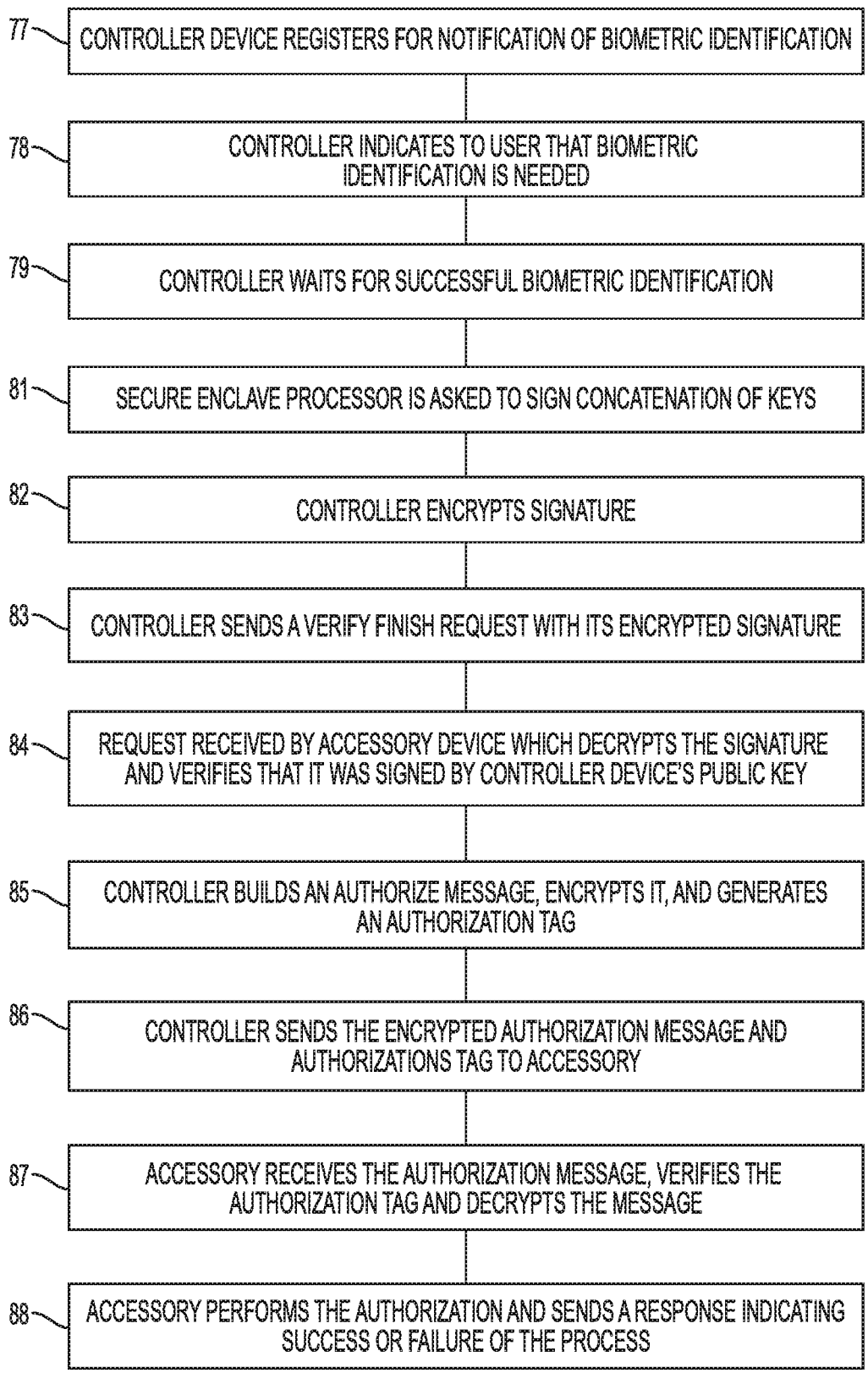
FIG. 11 is a flowchart illustrating example final operations in the process of authorizing an operation on an accessory device.

The next operation in the authorization process is to have the controller device sign data using its long term secret key and biometric authorization. This process begins with the controller device verifying biometric data from the user in operation 35 (FIG. 5). Referring to FIG. 11, the controller device registers for notification of biometric identification in operation 77. The controller device indicates to the user that biometric identification is needed in operation 78 and then waits for a successful biometric identification in operation 79. The processor (e.g., a secure enclave processor) is then asked to sign concatenation of keys in operation 81.

The next operation in the authorization process is verification to the accessory device (operation 37 in FIG. 5). The final phase of the station to station protocol for verification of the device pairing begins at operation 82 as the controller device encrypts its signature. At operation 83, the controller device sends a verify finish request with its encrypted signature to the accessory device, which is received by the accessory device at operation 84. At operation 84, the accessory device decrypts the signature and verifies that it was signed by the public key of the controller device.

The final step in the authorization process (operation 38 in FIG. 5) begins at operation 85 as the controller device builds an authorization message, encrypts the authorization message, and generates an authorization tag. At operation 86, the controller device sends the encrypted authorization message and authorization tag to the accessory device. The accessory device receives the authorization message, verifies the authorization tag and decrypts the authorization message at operation 87. The biometric authorization is completed at operation 88 when the accessory device performs the authorization and sends a response indicating success or failure of the process.

Various encryption algorithms may be used in various embodiments disclosed herein. For example, for Elliptic-Curve Diffie-Hellman (ECDH encryption), the algorithm may be Curve25519. For signature generation and verification, the algorithm Ed25519 may be used. For hashing, the SHA-512 algorithm may be used. For key derivation, the HKDF-SHA-512 algorithm may be used. The encryption algorithm is preferable ChaCha20 and for message authentication, the Poly1305 algorithm may be used. Of course, other encryption algorithms may be used for any of these functions without departing from the scope of the disclosed embodiments.

The various operations shown in FIGS. 4-11 can be performed by hardware, software, or a combination of hardware and software. Certain aspects of the disclosed embodiments may be provided as a computer program product, or software, that may include a computer-readable storage medium or a non-transitory machine-readable storage medium that stores instructions that may be used to program a processor (or other computing or processing device) to perform a process.

Additionally, although embodiments have been described in conjunction with a smartphone and a laptop, other embodiments are not limited to these electronic devices. Any suitable electronic device can be the first electronic device and the second electronic device. As one example, the first electronic device may be a smartphone and the second electronic device a wearable computing device, such as a smart watch or a health assistant. Biometric data can be used to pair the smartphone and the wearable computing device. Additionally or alternatively, biometric data may be received to permit the smartphone to unlock the wearable computing device. Additionally or alternatively, biometric data may be used to allow the smartphone (e.g., the user of the smartphone) to access applications, data, and/or functions on the wearable computing device. In another example, the first electronic device may be a tablet computing device and the second electronic device a smartphone. In yet another example, the first electronic device may be a digital music player and the second electronic device a tablet computing device.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A method for pairing a controller device with an accessory device, comprising:
   transmitting a start request from the controller device to the accessory device;
   receiving as an input from a user, at the controller device and subsequent to transmitting the start request, a personal identification number (PIN) generated by the accessory device;
   verifying with the accessory device that the PIN is correct;
   establishing a secure channel between the controller device and the accessory device in response to verifying that the PIN is correct;
   acquiring biometric data from the user, after verifying that the PIN is correct;
   authenticating the user, at the controller device, based at least in part on matching the acquired biometric data to a biometric template; and
   exchanging public keys over the secure channel in response to authenticating the user.

2. The method of claim 1, further comprising:
   after exchanging public keys:
   detecting, by the controller device, that the accessory device is within communication range;
   verifying a public key protocol between the controller device and the accessory device;
   verifying by the controller device biometric data of a user of the controller device;
   transmitting an authorization message by the controller device to the accessory device; and
   receiving at the controller device an authorization for the user to access the accessory device.

3. The method of claim 1, wherein the biometric data acquired from the user comprises fingerprint data.

4. The method of claim 1, wherein the biometric data acquired from the user comprises one of retina, iris, face, voice, or palm print data of the user.

5. The method of claim 1, further comprising, subsequent to receiving the PIN from the user, transmitting from the controller device, to the accessory device, a request for a secure remote password and a proof of the PIN.

6. The method of claim 1, further comprising, subsequent to authenticating the user at the controller device based on the acquired biometric data, and by a processor, generating an asymmetric key pair and returning a public key to the controller device.

7. The method of claim 6, wherein the processor is a secure enclave processor.

8. The method of claim 1, wherein exchanging public keys over the secure channel includes the controller device deriving a symmetric key using a secure remote password protocol shared secret key.

9. The method of claim 8, further comprising:
   encrypting, by the controller device, a public key;
   generating, by the controller device, an authorization tag; and
   exchanging respective encrypted public keys and authorization tags between the controller device and the accessory device.

10. The method of claim 1, wherein, subsequent to exchanging public keys over the secure channel:
    the controller device stores the public key of the accessory device; and
    the accessory device stores the public key of the controller device.

11. The method of claim 2, wherein the biometric data acquired from the user comprises fingerprint data.

12. The method of claim 2, wherein the biometric data acquired from the user comprises one of retina, iris, face, voice, or palm print data of the user.

13. The method of claim 2, wherein verifying the public key protocol comprises:
transmitting, from the controller to the accessory device, a verify start request including a public key of the controller device;
receiving at the controller device, from the accessory device, a first shared secret key based on a secret key of the accessory device and the public key of the controller device;
receiving at the controller device, from the accessory device, a response to the verify start request including an encrypted signed first concatenation of the public key of the controller device and a public key of the accessory device;
wherein the encrypted signed concatenation is encrypted using a symmetric key derived by the accessory device using the first shared secret key.

14. The method of claim 13, further comprising:
verifying, by the controller device, that the controller device has a public key of the accessory device;
generating, by the controller device, a second shared secret key using a secret key of the controller device; and
decrypting, by the controller device, the encrypted signed first concatenation, the decryption performed using the public key of the accessory device.

15. The method of claim 14, wherein transmitting the authorization message to the accessory device comprises:
after successful verification of the biometric data by the controller device, using a secure enclave processor to sign a second concatenation of the public key of the controller device and the public key of the accessory device;
encrypting the signed second concatenation by the controller device; and
transmitting, by the controller device to the accessory device, a verify finish request with the encrypted signed second concatenation.

16. The method of claim 15, wherein receiving at the controller device the authorization for the user to access the accessory device comprises:
building, by the controller device, an encrypted authorization message and an authorization tag;
transmitting, by the controller device to the accessory device, the encrypted authorization message and the authorization tag;
receiving, at the controller device from the accessory device, a message indicating whether the authorization for the user was successful.

17. A controller device comprising:
a biometric sensor; and
a processor;
wherein the processor is configured to pair the controller device with an accessory device by:
transmitting a start request from the controller device to the accessory device;
receiving as an input from a user, subsequent to transmitting the start request, a personal identification number (PIN) generated by the accessory device;
receiving from the accessory device a verification that the PIN is correct;
establishing a secure channel between the controller device and the accessory device;
acquiring biometric data from the user using the biometric sensor, after verification that the PIN is correct;
authenticating the user at the controller device, based at least in part on matching the acquired biometric data to a biometric template; and
exchanging public keys over the secure channel with the accessory device in response to authenticating the user.

18. The controller device of claim 17, wherein the processor is further configured to remotely authorize the user to access the accessory device to which it has been paired, by:
detecting that the accessory device is within communication range;
verifying a public key protocol between the controller device and the accessory device;
verifying biometric data of a user of the controller device;
transmitting an authorization message to the accessory device; and
receiving an authorization from the accessory device for the user to access the accessory device.

19. The controller device of claim 17, wherein the biometric data comprises fingerprint data.

20. The controller device of claim 17, wherein the biometric data comprises at least one of retina, iris, face, voice or palm print data of the user.

* * * * *